June 4, 1940. M. T. THORSSON 2,203,002
COUNTING SCALE
Filed Nov. 9, 1937 2 Sheets-Sheet 1

INVENTOR
Matthew T. Thorsson
BY
ATTORNEY

June 4, 1940.  M. T. THORSSON  2,203,002
COUNTING SCALE
Filed Nov. 9, 1937   2 Sheets-Sheet 2

INVENTOR
Matthew T. Thorsson
BY
ATTORNEY

Patented June 4, 1940

2,203,002

UNITED STATES PATENT OFFICE 2,203,002

COUNTING SCALE

Matthew T. Thorsson, East Williston Park, Long Island, N. Y., assignor to International Business Machines Corporation, New York, N. Y., a corporation of New York Application November 9, 1937, Serial No. 173,569

6 Claims. (Cl. 265—29)

This case relates to a counting scale of the type disclosed in Patent No. 1,650,227.

The sensitivity of any weighing scale to an applied load is proportional to the ratio of the applied load to the total capacity of the scale. Thus, in weighing a small fraction of the total weight capacity, the indicating means will move a corresponding fraction of its total range and such movement will be less sensitive than a larger movement would be for the same applied load. It has been known in a scale of a given total load capacity to provide supplementary weighing means for weighing a fractional part of the total load capacity with greater sensitivity by effecting movement of the indicating means for the fractional load multiplied with respect to the movement the indicating means would have if the same fractional load were applied through the main weighing mechanism.

One object of the present invention is to provide novel supplementary means supplementing the main weighing mechanism for weighing a fractional increment of the total load capacity of the main weighing mechanism.

The counting scale of the type disclosed in the aforesaid patent has a main weighing mechanism for moving a counting chart which has a graduated scale and figures indicating the count. This chart is intersected by an indicator line which is settable by hand or by a unit load weighing mechanism to a reference position, and the point of intersection indicates the figure to be read from the chart. The value of the graduations of the chart is dependent on the movement of the main weighing scale for increments of load and on the unit load to which a reference position of the indicating line corresponds. As the unit load increases the graduation values increase, making it more difficult to interpolate readings of the chart between graduations.

Accordingly, another object of the present invention is to decrease the value of a graduation of the chart by effecting a multiplied movement of the chart for a given applied load.

Further, in the counting scale of the aforesaid type, the indicating line and the chart graduated line intersect at an angle which is proportional to the unit load acting on the indicating line. When the angle is too small between the indicating line and the chart line, the point of intersection is less definitive than with a greater angle. The chart has several columns of figures based on a unit load or reference position of the indicating line. When the pieces to be counted are very light, the maximum angular position of the unit indicating line, is not at an advantageous angle to the chart line.

Accordingly, still another object is to permit the unit load to be multiplied to thereby move the unit indicator to a more advantageous angle and to maintain the relation of the figures of the chart to the unit indication the same by also multiplying the movement of the chart.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

Figure 2:
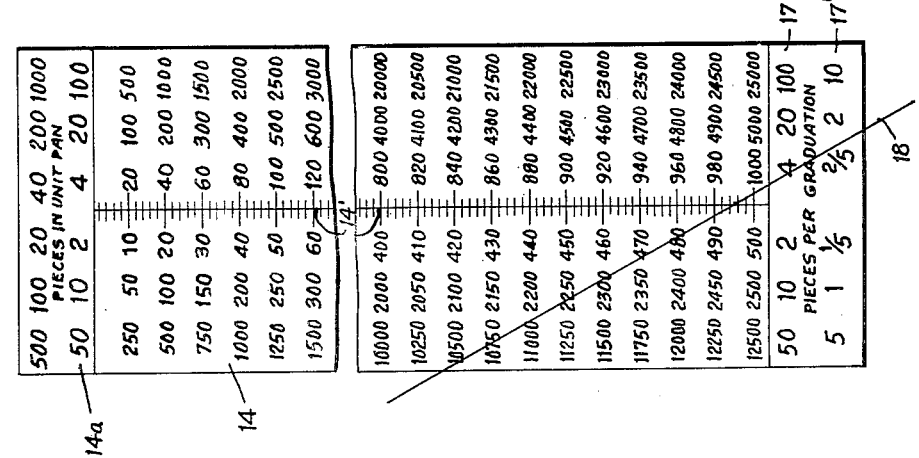
Fig. 2 shows fragments of the counting chart and the unit indicator coacting therewith.

The scale has a main weighing mechanism comprising a main load platform 10 acting on one arm of a first order lever 11, the opposite arm of which is provided with a tare bar 12 outside the scale casing 13. Rigid with the lever is an arm 1 (Fig. 3) inside the scale casing which has a tape connection 2 to a main pendulum assembly 3 provided with an upwardly extending arm 4. Pivotally carried by arm 4 is a balanced lever 5 which is pivotally connected by pins 6 (only one is shown) to a frame 7 (see Figs. 2 and 3) to which the counting chart 14 is fixed. Extending from frame 7 is a pin 8 which is spaced above the pin 6. Between these pins 6 and 8 is stretched a guide wire 9. An arm 7' extending from frame 7 carries, at its free end, a pair of vertically spaced pins 7a straddling guide wire 9. When a load is applied to the platform 10, the lever arm 1 rocks downwardly, acting through tape connection 2 to rock the main pendulum assembly clockwise, causing pointer 15 to swing along the main weight indicating scale 16. As the pendulum assembly 3 rocks clockwise, arm 4 thereof actuates balanced lever 5 to move chart 14 horizontally to the right. The chart is constrained to move rectilinearly, maintaining its vertical position, by engagement of the pins 6 and 8 with guide wire 9 and by similar engagement of pins 7a with the wire. Chart 14 has a central, vertical, graduated index line 14' and six columns of figures, each headed by a lower scale 14a of unit load figures "50", "10", "2", etc. Below the chart columns is a scale 17 of similar figures designating the value of each graduation for the different columns.

Figure 1:
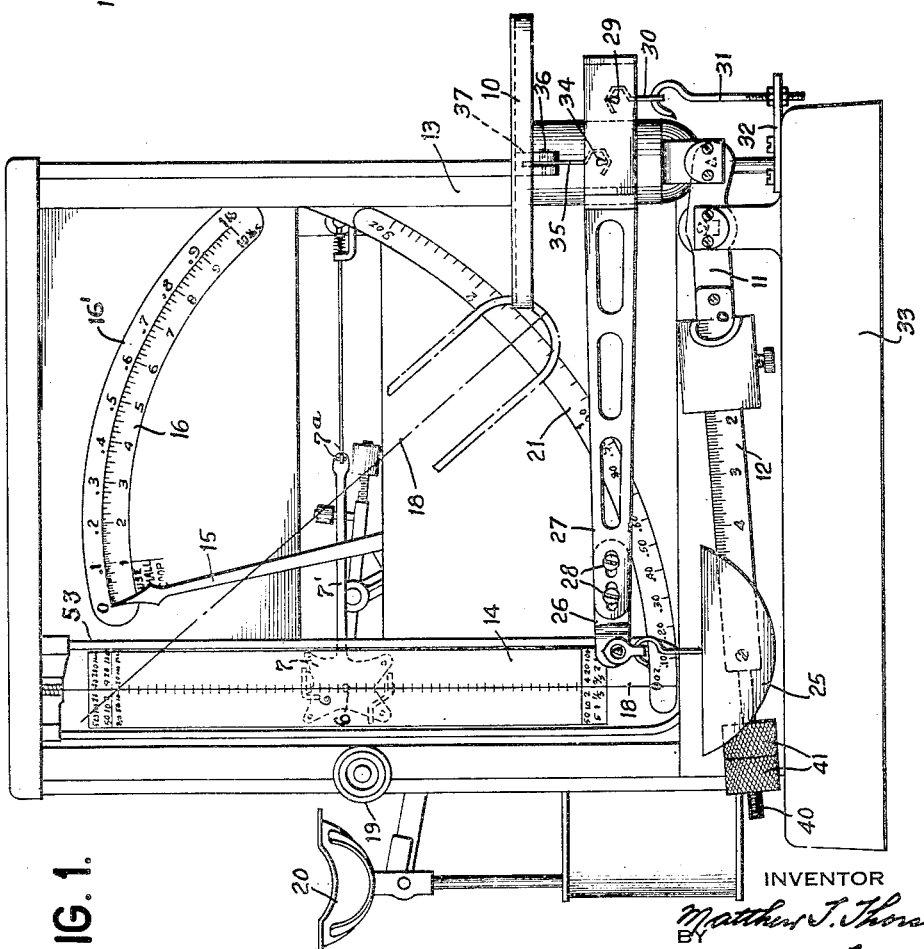
Fig. 1 is a front view of the scale.

The scale also has a unit load weighing mechanism comprising a hair line or indicating line 18 which may be manually set to an index or reference position by turning a knob 19 or may be automatically set by applying the unit load to the unit pan 20. The unit pan is carried by a parallelogram lever system 50 which is connected by a tape 51 to a unit scale pendulum assembly 52 which carries the supporting frame 53 of the hair line 18. When a load is applied to pan 20, the lever system 50 rocks counterclockwise, causing corresponding rocking of the pendulum assembly 52 and the hair line 18. The hair line may be set manually by turning of the knob 19 (Fig. 1). Rigid with the knob is a pinion 54 meshed with a rack bar 55. When the knob 19 is turned, it lowers the rack bar to cause the lower end thereof to engage the upper lever 50 and rock it to the same effect as though a load had been applied to unit pan 20. One actuated position of the hair line is indicated in dot and dash lines in Fig. 1 and another in full line in Fig. 2. The weight of parts in the unit pan is indicated by hair line 18 along a lower scale 21. With a unit load made up of fifty parts an unknown number of which have been applied to the main platform 10, the count of parts on the main platform is indicated in the column headed by "50" of scale 14a and along a horizontal line extending through the point of the index line 14' intersected by hair line 18. Similarly, any other column may be used to indicate the count by placing the number of parts in the unit pan 20 designated by the heading in scale 14a of the column. When the intersected point lies between successive graduations of the index line 14', the observer is required to interpolate between the graduations. The interpolation is dependent on the value of each graduation denoted at the bottom in scale 17, of the column from which the count is read.

In operation, an unknown number of parts to be counted is applied to the main platform 10 and a unit quantity of the same parts applied to the unit pan 20. The chart 14 will be moved to the right to a position dependent on the aggregate weight of the parts applied to the main platform and the hair line 18 will move to an angular position corresponding to the aggregate weight of the unit quantity of parts. At the intersection of the hair line 18 with the index line 14', the count of parts on the main platform will be given in the column corresponding to the unit quantity of parts in the unit pan.

For further details of the above described mechanisms, reference may be had to the aforementioned Patent No. 1,650,227.

When the aggregate weight of the unknown number of parts on main platform 10 is a small fraction of the total capacity of the main scale, chart 14 will move correspondingly a small amount. Also, sufficient number of parts should be placed in unit pan 20 to move the hair line 18 to a substantial angle of intersection with the index line 14' of the chart. Should the parts having a small aggregate weight be individually of very light weight, one hundred of such parts— the maximum permitted when the main load is placed on main platform 10—may not be sufficient to move the hair line 18 to a good reading angle. Also, since each graduation in the "100" column has a high value of one hundred parts, the difficulty of interpolation is increased with hair line 18 at a poor angle of intersection and failing to provide a clearly definitive intersection point with index line 14'. The difficulty of interpolation may be remedied either by increasing the angle of the hair line 18 or by lowering the value of each graduation. Thus, if each graduation has a value of one hundred, a variation may be obtained by different observers in interpolating the count which may amount to twenty-five or fifty parts. However, with the value of a graduation reduced one-tenth, for example, so that each graduation in the "100" column corresponds only to ten, the same variation will be reduced correspondingly to one-tenth or two to five parts. With parts running in large numbers to an ounce, a variation of five parts corresponds to an insignificant percentage of variation from the exact count.

When the parts to be counted are of extremely light individual weight, a considerable number of such parts will have an aggregate weight amounting to a small fraction of the total capacity of the main weighing mechanism. Correspondingly, the unit quantity of such parts, placed in load pan 20 will move hair line 18 to a small angle relative to the index line 14' of the chart. As indicated in Fig. 1, the "0" to "1" lb. range of main weight scale is marked "use small scoop." This informs the operator when a large quantity of parts on main platform 10 weighs less than one pound, that he should place the unknown quantity of pieces to be counted in small scoop 25.

Scoop 25 is suspended from one end of an extension 26 carried by one arm of a lever 27. The lever 27 has elongated slots through which screws 28 freely pass to be threaded into extension 26. By loosening screws 28, extension 26 may be adjusted to locate scoop 25 at a predetermined distance from the fulcrum of lever 27, after which the screws are tightened to rigidly fix the extension 26 and scoop 25 in position. Lever 27 has a knife edge 29 at the right hand end engaging the V-shaped bearing trough of a hook 30 connected to an adjustable hook 31 fastened rigidly but adjustably to a bracket 32 secured to the base 33 of the scale frame. Knife edge 29 in coaction with the bearing portion of hook 30 defines the fulcrum of lever 27. To the left of knife edge 29, lever 27 has another knife edge 34 having bearing engagement with a hook 35 suspended by a pin 36. Pin 36 is supported by the legs of a bifurcated block 37 rigidly secured to the bottom of main platform 10.

The length of lever 27 between knife edge 34 and fulcrum 29 constitutes the power arm of the lever while the length of the lever between scoop 25 and the fulcrum constitutes the load arm of the lever. The lever ratio of the load arm to the power arm determines the power applied to platform 10 by the load in scoop 25. In the present case, the scoop is adjusted to provide a lever ratio of ten; that is, the weight of a load in scoop 25, through lever 27, exerts ten times the force on platform 10, and is equivalent to placing ten times the same load directly on platform 10. Thus, with a normal total capacity of 10 lbs., 1 lb. directly on main platform 10 will move the pointer 15 through one-tenth its total range and correspondingly move the chart 14 a fractional amount of its total range. By applying the 1 lb. directly to scoop 25, pointer 25 and chart 14 will move their entire total ranges. Accordingly, with the movements of the pointer and chart thus multiplied, the fractional load will be most sensitively and accurately measured. Thus, 1 oz. in scoop 25 will be measured as sensitively as 1 lb. on platform 10, whereas 1 oz. directly on platform 10 would be measured with a fractional degree of the sensitivity of the 1 lb. load. Similarly, multiples of 1 oz. up to 1 lb. in scoop 25 will be measured with the same degree of sensitivity as ten times the same load applied to the main platform. Coextensive with scale 16 is a scale 16' marked in a different color and the graduations of which have one-tenth the value of scale 16. When using the scoop 25, the weight in the scoop is measured by pointer 15 on scale 16'.

The chart 14 as well as the pointer 15 may be considered as measuring the load, although the chart 14 measures the load in terms of the count of parts in the load. Thus, for small fractional loads up to 1 lb., chart 14 will measure the count of parts more sensitively when the load of parts is placed in scoop 25 than when placed on platform 10.

In effect, the scoop 25 and lever 27 with the connections to the main weighing mechanism form an extension to the main weighing mechanism enabling the latter to be converted into a scale of reduced capacity but with the same indicating range to thereby more sensitively respond to and indicate fractional weights.

In order to counterbalance the dead weight and the effect of the main scale extension parts (scoop 25, lever 27, and the elements carried by and connected to the lever), the left end of tare bar 12 is provided with a special threaded rod 40 carrying a pair of nuts 41, adjusted to cause their combined weight acting through tare bar 12 to counteract the weight of the scale extension.

Figure 3:
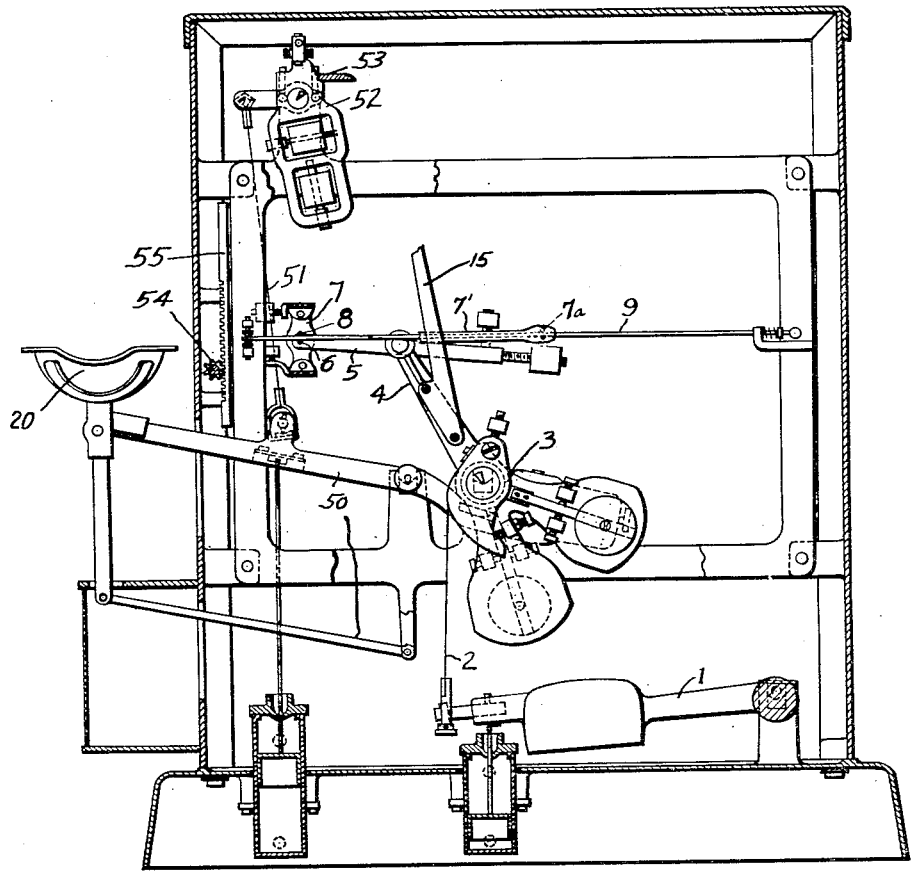
Fig. 3 is a vertical section through the scale, showing the weighing mechanism.

The provision of the supplementary small capacity weighing extension enables the scale to be used in several novel ways. In one mode of operation, when the aggregate weight of a quantity of parts to be counted is less than 1 lb., and it is desired to obtain the count with the utmost degree of accuracy, the parts are placed in scoop 25. The weight of parts in scoop 25 will move chart 14 ten times as far as the same weight placed on platform 10. Accordingly, the figures and graduation values of the chart will have one-tenth their normal indicated value. Assuming one hundred parts are required in unit pan 20 to position hair line 18 at a good intersecting angle to chart index line 14', the "100" column will give the count of parts in scoop 25. Suppose the intersecting point to lie midway between the lowest wide graduation and the next to lowest wide graduation of index line 14', that is between the graduation alined with "24500" and the one alined with "25000" in the "100" column, as indicated in Fig. 2. Each graduation now has a value of "10" instead of "100", as indicated below the normal scale of graduations 17 by a supplementary scale 17' preferably marked in red. Thus, the figures in the "100" column are divided by ten, so that the count is between 2450 and 2500 pieces. By interpolation, giving each graduation a value of "10", the count is obtained as 2475 pieces in unit pan 25. To better understand the advantages of this mode of operation, assume the same quantity of unknown number of parts to be taken from scoop 25 and placed on main platform 10. With one hundred such parts in unit pan 20, the hair line 18 will take the same angular position as in the previous example. However, chart 14 will have moved only one-tenth as far to the right, and the point of intersection will lie between the wide graduation 5 alined with "2500" of the "100" column and the graduation directly above. With each graduation having its normal value of 100, the observer may interpolate the count as somewhere between 2400 and 2500 parts. Depending on the skill of the observer, he may variously interpolate the count as 2425, 2450, 2475, etc. But, in the previous case with the parts placed in scoop 25, the reading was definitely indicated as half way between 2450 and 2500, giving the observer no leeway for an incorrect interpolation of the count. In the second case with the parts on platform 10, the reading was indicated, at best, as somewhere near the 2500 point. It is evident that the latter indication is more difficult of accurate interpolation than when the indication is given with the parts placed in scoop 25 and the graduations having one-tenth their normal value. As the number of parts, 2475, is comparatively small, a variation in interpolation of twenty-five parts would amount to a substantial percentage of variation. This variation is avoided by placing the parts to be counted, when the aggregate weight thereof is less than 1 lb., in scoop 25 and giving the graduations of chart 14, one-tenth their normal value. Further, due to the fact that the weight of parts in scoop 25 will more sensitively and accurately position chart 14, the accuracy of reading of the count when the parts are in scoop 25 is further increased over the accuracy which may be obtained by placing the parts on platform 10.

A second mode of operation permitted by the provision of the main scale extension 25—27 will now be described. Assume the parts to be counted have an aggregate weight less than 1 lb., and that the individual parts are so light that one hundred of them in unit pan 20 will not move hair line 18 to a good intersecting and reading angle. With the parts to be counted placed on platform 10 and one-hundred of these parts in unit pan 20, the hair line 18 will make an acute angle with chart line 14' such as to render the point of intersection not definitive enough to enable interpolation to be effected with the greatest degree of accuracy. In order to overcome this difficulty, the parts to be counted are placed in scoop 25. One result of this is to increase the sensitivity and accuracy of response of the counting chart 14 to the small aggregate weight—less than 1 lb.—of the parts to be counted. As another result of placing the parts to be counted in scoop 25, the operator may count out ten times the number of unit load parts normally indicated by the scale of figures "50", "10", etc. heading the chart columns and as indicated by the scale of figures "500", "100", "20", etc. preferably marked in red above the normal scale of unit quantity figures. Thus, since one hundred parts have not moved hair line 18 of the unit load scale to a fair angle of intersection with index line 14' of chart 14, the operator now may count out 200, 500, or 1000 parts into unit pan 20, thereby causing hair line 18 to move to a greater angle relative to chart index line 14'. Since the chart has moved ten times as far due to the application of the load to scoop 25 instead of to platform 10 and the number of parts in the unit pan has also been multiplied ten times, the count indicating relationship between the unit load scale and the main scale remains the same. Hence, the figures in the chart columns now apply unchanged to the load in scoop 25, with each graduation having its normal value indicated by scale 17. Due to the multiplied unit load quantity, hair line 18 will take a good reading angle and provide a definitive point of intersection with the chart index line 14', enabling the observer to accurately read and interpolate the count of parts in scoop 25.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a scale for counting the number of units in a load; a movable counting chart having graduations to indicate counts, a movable unit value indicator settable according to a unit value for coacting with said graduations to denote the count of units in the load, weighing mechanism connected to the chart, a main receiver carried by the weighing mechanism and to the load on which the weighing mechanism responds for moving the chart in a direction to bring graduations into correlation with said indicator for indicating the count of units in the load, with each graduation having a normal, count value, a supplementary receiver to alternatively receive the load, and means connecting the supplementary receiver to the weighing mechanism to effect automatic response of the latter for moving the chart in the aforesaid direction under the influence of the load when applied to the latter receiver, in predetermined multiple ratio to movement of the chart under the influence of the load when applied to the main receiver, for bringing chart graduations into count indicating relation to the unit value indicator and with each graduation having a count indicating value which is a fraction of the normal count indicating value equal to the reciprocal of the aforesaid multiple ratio of chart movement.

2. In a scale for counting the number of units in a load, a movable counting chart with count indicating graduations, a movable unit value indicator settable according to a normal unit value for coacting with said graduations to indicate the count of units in the load, weighing mechanism connected to the chart, a main receiver carried by the weighing mechanism and to the load on which the weighing mechanism responds to move the chart in a direction to bring graduations thereof into coaction with said unit value indicator for indicating the count of units in the load, a supplementary receiver to alternatively receive the load, and means connecting the supplementary receiver to the weighing mechanism to effect automatic response of the latter for moving the chart in the aforesaid direction under the influence of the load when applied to the latter receiver, in predetermined multiple ratio to movement of the chart under the influence of the load when applied to the main receiver, for bringing the same graduations into correlation with the unit value indicator when the latter is set according to a unit value which is a multiple of the normal unit value equal to the aforesaid multiple ratio of movement of the chart.

3. In a scale; movable load responsive means, a main load platform connected to the load responsive means to cause movement of the latter according to the magnitude of the load on the main platform, a supplementary platform for alternatively receiving the load, and force-multiplying connections directly between the supplementary platform and the main platform removed from and free of the load receiving area of the main platform for acting directly through the latter to effect movement of the load responsive means in response to the load on the supplementary platform in multiplied ratio to the response of said means to the same load when applied to the main platform, both platforms being free to alternatively receive the load while said power-multiplying connections remain in place.

4. In a scale; movable load measuring means, a main load platform connected to the measuring means to cause movement of the latter according to the load on the main platform, a supplementary load receiver, and lever means carrying the latter receiver and having a direct pull connection with and dependent from the bottom of the main platform leaving the latter constantly free to receive a load, and said lever means having its force receiving and force transmitting sections proportioned to provide force-multiplying connection from the supplementary load receiver to the main platform for acting directly through the latter to effect movement of the measuring means in response to the load, when on the supplementary receiver, in multiple ratio to the response of the measuring means to the same load when on the main platform.

5. In a scale; movable load measuring means, a main platform on top of which a load may be applied and connected to the measuring means to cause movement of the latter according to the load, a supplementary load receiver, and a lever carrying the latter receiver and having a portion passing below the platform and hung from the bottom of said platform, leaving the top of the latter freely exposed to receive loads, and the moment arm on said lever of the supplementary receiver being a multiple of the moment arm of the hanging connection to cause the load when on the supplementary receiver to act through the platform in multiplied force ratio on the measuring means.

6. In a scale; movable load measuring means, a main platform structure on top of which a load may be applied and connected to the measuring means to cause movement of the latter according to the load, a supplementary load receiver and a lever system supporting the latter receiver and including a lever provided with a portion passing below the main platform structure and hung directly from said platform structure so as to leave the top thereof freely exposed to receive loads, and the ratio of the lever system being such as to cause the load when on the supplementary receiver to act through the platform in multiplied force ratio on the measuring means.

MATTHEW T. THORSSON.